Jan. 13, 1942.    A. C. LINDGREN    2,270,207
HARROW CONSTRUCTION
Filed Sept. 7, 1940    2 Sheets-Sheet 1

Inventor
Alexus C. Lindgren
By Paul O. Pippel
Atty.

Jan. 13, 1942.  A. C. LINDGREN  2,270,207
HARROW CONSTRUCTION
Filed Sept. 7, 1940   2 Sheets-Sheet 2
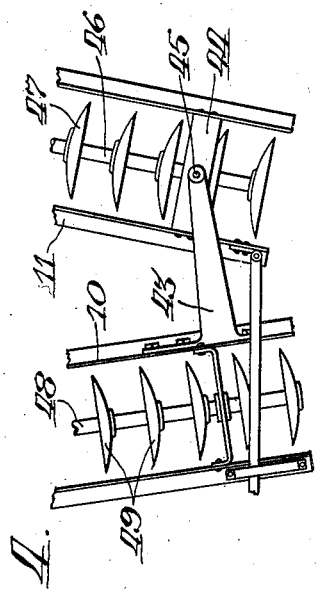
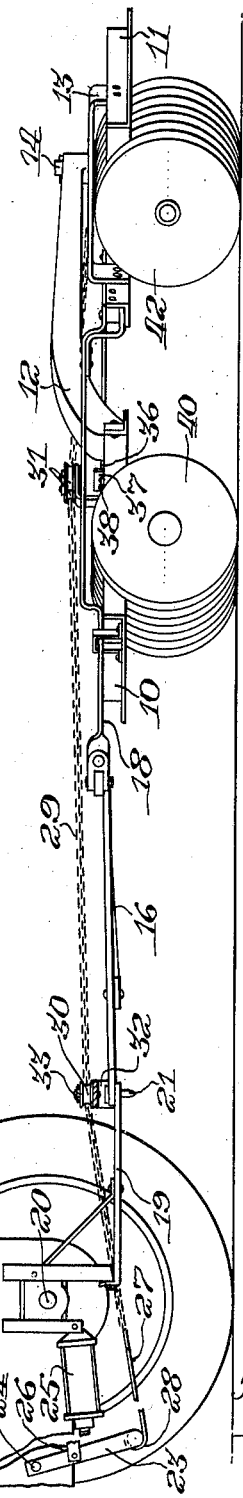
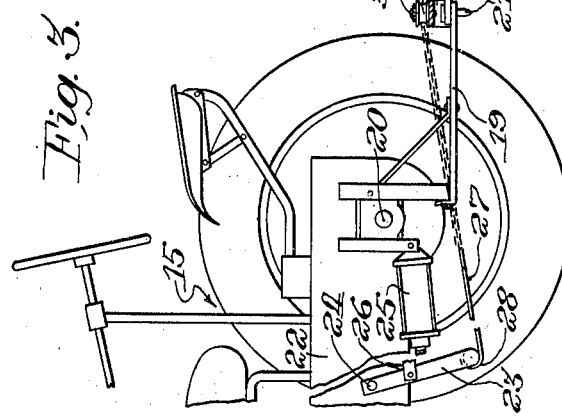
Inventor
Alexus C. Lindgren
By Paul O. Pippel
Atty Patented Jan. 13, 1942

2,270,207

UNITED STATES PATENT OFFICE 2,270,207

HARROW CONSTRUCTION

Alexus C. Lindgren, Cherry Valley, Ill., assignor to International Harvester Company, a corporation of New Jersey Application September 7, 1940, Serial No. 355,784

9 Claims. (Cl. 55—83)

This invention relates to a harrow construction. More specifically it relates to means for controlling an offset harrow in working position.

It has been found that under a good many soil conditions it is necessary to lock the gangs of an offset harrow against relative movement in working position so that the gangs do not shift into and out of position continually during operation. Under certain circumstances it may be very inconvenient to provide a lock for holding the gangs against relative movement. Consequently, some other means for accomplishing this result must be employed.

An object of the present invention is to produce an improved harrow.

Another object is the production of an offset harrow which may be controlled easily in working position.

A further object is to produce an offset harrow so constructed that a lock for holding the gangs in working position is unnecessary.

According to the present invention, the gangs of an offset harrow are pivotally connected so that the pivot point axis either intersects the shaft of the rear gang or is to the rear of this shaft. Thus, the reactive force of the ground against the disks of the rear gang either has no tendency to force the rear gang out of angle or tends to force it into angle.

In the drawings:

Figure 3 is a side view of the harrow; and,

Figure 4 is a plan view of part of a modified form of harrow.

Figure 1:
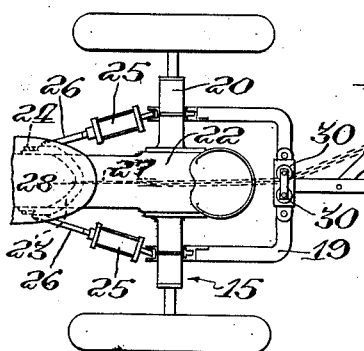
Figure 1 is a plan view of the improved harrow of the present invention in working position.
Figure 1:
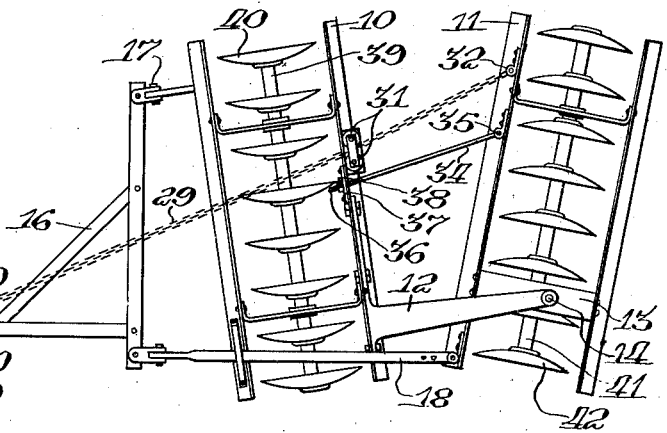

The improved harrow of the present invention comprises a front gang 10, a rear gang 11, and means forming a pivotal connection between the gangs comprising a bracket 12 secured to the rear side of the front gang and extending upwardly and rearwardly over the rear gang, an inverted U-shaped member 13 connected to the upper side of the rear gang 11, and a pivot bolt 14 connecting the bracket and the U-shaped member. The harrow is connected to a tractor 15 by means of a triangular hitch frame 16 connected as at 17 to the front gang and by means of a draft member 18 to the rear gang. As seen in Figure 3, the hitch frame 16 is pivotally connected by means of a bolt 21 to a U-shaped draw-bar 19 secured to a rear axle 20 on the tractor 15.

As shown more fully in the copending application of Mott, Serial No. 321,154, filed February 28, 1940, a body portion 22 of the tractor is embraced by a U-shaped bail 23 pivotally connected to the body portion as at 24. The U-shaped bail is moved fore and aft under the action of fluid power devices 25 of the type shown in the patent to Lindgren 2,156,570, May 2, 1939. These devices comprise essentially a cylinder and a piston movable therein under the action of the fluid under pressure supplied by the power of the tractor. Rods 26 connected to the piston within the power devices 25 are pivotally connected to the sides of the U-shaped member 23. A rod 27 is connected to the U-shaped member 23 by means of a hook end portion 28. A chain 29 is connected to the other end of the rod 27 and extends rearwardly through a pair of rollers 30 carried on the tractor draw-bar 19 and through a pair of rollers 31 on the front gang to a point of connection 32 with the rear gang of the harrow. The rollers 30 are mounted upon a member 32 extending upwardly from the draw-bar 19. A piece 33 is attached to the top side of the rollers so that the chain 29 is completely enclosed in a space formed by the member 32, the roller 30, and the piece 33. The point at which the chain 29 passes between the rollers 30 is substantially over the pin 21 forming the pivotal connection between the tractor draw-bar 19 and the harrow hitch frame 16 so that any pivoting of the harrow with respect to the tractor has no effect upon the tautness of the chain. A rod 34 is pivotally connected at one end as at 35 to the rear gang 11, and has a threaded portion 36 at the other end which extends through a part 37 on the front frame. A nut 38 engages the threaded portion 36 and serves as an adjustable stop for the working position of Figure 1.

The working parts of the front gang 10 comprise a shaft 39 having disks 40 mounted thereon. The rear gang 11 includes a shaft 41 with disks 42 mounted thereon. It is to be noted from Figures 1 and 2, that the bolt 14, which forms the pivot between the front and rear gangs is to the rear of the gang shaft 41. The disks 42 on the rear gangs have their concave sides toward the left. Thus, the reactive force of the ground upon the disks of the rear gang is to the right and since the pivot point of the rear gang, that is, the pivot bolt 14, is to the rear of the shaft 41, the resultant turning movement urges the rear gangs to the rear. Thus, the rear gang is held in angle not only by the drag of the ground upon the gang but also by the lateral forces exerted by the ground against the concave side of the disks. The present construction with the pivot point between the gangs to the rear of the rear gang shaft is accordingly of considerable advantage over the constructions used heretofore in which the pivot point was forward of the rear gang shaft, and the turning movement exerted by the ground against the concave side of the rear gang disk urged the rear gang forwardly.

Figure 4 shows a modified construction in which the pivot point axis between the gangs intersects the rear gang shaft. As shown in this figure, a front gang 10 is connected to a rear gang 11 by a bracket member 43 secured to the rear side of the front gang, an inverted U-shaped member 44 secured to the rear gang, and pivot bolt 45, pivotally connecting the bracket 43 and member 44 and extending along a line intersecting a rear gang shaft 46 carrying disks 47. The front gang 10 has a shaft 48 carrying disks 49. Since the pivot axis of the rear gang with respect to the front gangs is on a line intersecting the rear gang shaft, the lateral forces of the ground against the concave sides of the disks 47 exert no turning movements on the rear gang 11. Consequently, there is no tendency for the rear gang to run forward from its working position.

Figure 2:
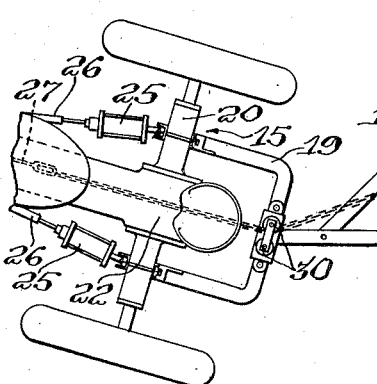
Figure 2 is a plan view of the harrow with the gangs in position for a turn to the right.
Figure 2:
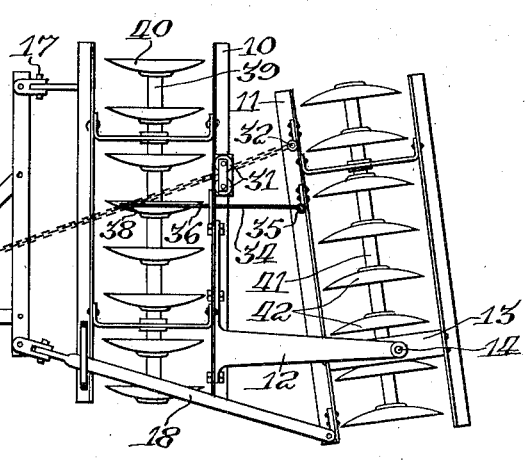

Shifting of the gangs from the position of Figure 1 to that of Figure 2, from which a right turn may be made, is accomplished by means of the fluid power devices 25 mounted on the tractor 15. Fluid under pressure admitted to the devices 25 moves the U-shaped member 23 forward. Thus, the chain 29 is pulled forward, the end of the rear gang 11 to which the chain is connected is pulled forward, and the gangs assume the position shown in Figure 2.

It will be apparent from the foregoing description of the invention that a new and novel harrow construction has been devised in which there is no need for a lock which holds the gangs in working position, since the tendency of the rear gang to run forward from working position is eliminated by the interconnection of the gangs in such a way that reactive forces of the ground upon the concave side of the rear disks is made to turn the rear gang rearwardly or at least not forwardly.

The intention is to limit the invention only within the scope of the appended claims.

What is claimed is:

1. In combination, a tractor, an offset harrow connected at the rear thereof and comprising a front gang having a shaft and disks mounted thereon, a rear gang having a shaft and disks mounted thereon, and means forming a connection between the gangs for relative angular movement between the gangs about a pivot to the rear of the rear gang shaft, and means connecting the rear gang and the tractor for producing relative angular movement between the gangs.

2. In combination, a tractor, an offset harrow connected at the rear thereof and comprising a front gang having a shaft and disks mounted thereon, a rear gang having a shaft and disks mounted thereon, and means forming a connection between the gangs for relative angular movement between the gangs about a pivot intersecting the rear gang shaft, and means connecting the rear gang and the tractor for producing relative angular movement between the gangs.

3. In combination, a tractor, an offset harrow connected at the rear thereof and comprising a front gang having a shaft and disks mounted thereon, a rear gang having a shaft and disks mounted thereon, and means forming a connection between the gangs for relative angular movement between the gangs about a pivot as far to the rear as the rear gang shaft, and means connecting the rear gang and the tractor for producing relative angular movement between the gangs.

4. In combination, a tractor having a power plant, a harrow connected at the rear thereof and comprising front and rear gangs, each having a shaft and disks mounted thereon, and means forming a connection between the gangs for relative angular movement between the gangs about a pivot to the rear of the rear gang shaft, and means connecting the rear gang and the tractor power plant for producing relative angular movement between the gangs.

5. In combination, a tractor having a power plant, a harrow connected at the rear thereof and comprising front and rear gangs, each having a shaft and disks mounted thereon, and means forming a connection between the gangs for relative angular movement between the gangs about a pivot intersecting the rear gang shaft, and means connecting the rear gang and the tractor power plant for producing relative angular movement between the gangs.

6. In combination, a tractor having a power plant, a harrow connected at the rear thereof and comprising front and rear gangs, each having a shaft and disks mounted thereon, and means forming a connection between the gangs for relative angular movement between the gangs about a pivot as far to the rear as the rear gang shaft, and means connecting the rear gang and the tractor power plant for producing relative angular movement between the gangs.

7. An offset harrow comprising a front gang having a shaft and disks mounted thereon, a rear gang having a shaft and disks mounted thereon, means connecting the gangs for relative angular movement about a pivot to the rear of the rear gang shaft, a hitch frame pivotally connected adjacent one end of the front gang, and means connecting the hitch frame and a point on the rear gang spaced from the pivot point of the gangs.

8. An offset harrow comprising a front gang having a shaft and disks mounted thereon, a rear gang having a shaft and disks mounted thereon, means connecting the gangs for relative angular movement about a pivot intersecting the rear gang shaft, a hitch frame pivotally connected adjacent one end of the front gang, and means connecting the hitch frame and a point on the rear gang spaced from the pivot point of the gangs.

9. An offset harrow comprising a front gang having a shaft and disks mounted thereon, a rear gang having a shaft and disks mounted thereon, means connecting the gangs for relative angular movement about a pivot as far to the rear as the rear gang shaft, a hitch frame pivotally connected adjacent one end of the front gang, and means connecting the hitch frame and a point on the rear gang spaced from the pivot point of the gangs.

ALEXUS C. LINDGREN.